US008077815B1

(12) United States Patent
Johnston

(10) Patent No.: US 8,077,815 B1
(45) Date of Patent: Dec. 13, 2011

(54) SYSTEM AND METHOD FOR PROCESSING MULTI-CHANNEL DIGITAL AUDIO SIGNALS

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 2086 days.

(21) Appl. No.: 10/989,531

(22) Filed: Nov. 16, 2004

(51) Int. Cl.
*H04L 27/08* (2006.01)

(52) U.S. Cl. .......................... 375/345; 375/354; 375/316

(58) Field of Classification Search .................. 375/345; 381/18; 330/129, 254; 455/234.1
See application file for complete search history.

(56) References Cited

U.S. PATENT DOCUMENTS 4,811,404 A * 3/1989 Vilmur et al. ................ 381/94.3
5,485,524 A * 1/1996 Kuusama et al. ............ 381/94.3
5,528,694 A 6/1996 Van De Kerkhof et al.
5,563,358 A 10/1996 Zimmerman
5,677,957 A * 10/1997 Hulsebus .......................... 381/1
5,852,630 A * 12/1998 Langberg et al. ............. 375/219
5,970,152 A * 10/1999 Klayman .......................... 381/1
6,222,927 B1 4/2001 Feng et al.
6,442,278 B1 8/2002 Vaudrey et al.
6,668,061 B1 12/2003 Abel
6,683,959 B1 1/2004 Kuwano et al.
7,120,256 B2 * 10/2006 Grancea et al. ................. 381/55
7,242,782 B1 * 7/2007 Kasai et al. ..................... 381/97
2001/0031053 A1 10/2001 Feng et al.
2003/0147538 A1 * 8/2003 Elko ............................... 381/92
2006/0247923 A1 * 11/2006 Chandran et al. ............. 704/211
2008/0304671 A1 * 12/2008 Kulkarni ......................... 381/17

FOREIGN PATENT DOCUMENTS

EP 0553832 B1 8/1993
EP 0608937 B1 4/2000
JP 07064577 A2 3/1995

OTHER PUBLICATIONS

"At a Glance—The essential tool for professional digital audio", *Adobe Audition version 1.5, Microsoft Windows 2000/Windows XP*, 2 Pages.
"Frequently Asked Questions—Frequently asked questions about Adobe Audition", *Adobe Audition version 1.5*,, 3 Pages.
"New Feature Highlights—The essential tool for professional digital audio", *Adobe Audition version 1.5, Microsoft Windows 2000/Windows XP*, 6 Pages.
"Unlimited, Low Cost, Instantly Available Background Music From the Original Source", *The Thompson Vocal Eliminator*, 7 Pages.
Chandler, Jr., James , "[music-dsp] Extract the center Information from a stereo signal", 2 Pages.
Barry, Dan, et al., "Real-time Sound Source Separation: Azimuth Discrimination and Resynthesis", *Audio Engineering Society 117th Convention*, Convention Paper 6258, San Francisco, CA, (Oct. 28, 2004),pp. 1-7.

* cited by examiner

*Primary Examiner* — Shuwang Liu
*Assistant Examiner* — Helene Tayong
(74) *Attorney, Agent, or Firm* — Schwegman, Lundberg & Woessner, P.A.

(57) ABSTRACT

A system and method for processing multi-channel audio signals is described herein. In one embodiment, the system includes a phase detector to determine, for a frequency band, a phase difference between first and second channel signals of the multi-channel digital audio signal. In one embodiment, the system also includes an attenuator to attenuate an amplitude of the frequency band if the phase difference exceeds a first predetermined threshold.

33 Claims, 9 Drawing Sheets

SYSTEM AND METHOD FOR PROCESSING MULTI-CHANNEL DIGITAL AUDIO SIGNALS

BACKGROUND

1. Field

Embodiments of this invention relate generally to the field of signal processing and more particularly to the field of multi-channel digital audio signal processing.

2. Description of Related Art

Stereophonic ("stereo") sound systems have two or more separate audio signal channels (e.g., left and right channels). Having at least two audio signal channels allows stereo systems to replicate aural perspective and position of sound sources (e.g., instruments of a stage band). During playback, a listener's proximity to the stereo system's speakers will often determine which instruments or tones they hear. Two-channel stereo systems are often thought to have three distinct places where sound can be perceived. Thus, in addition to left and right channels, a center channel can be formed when an equal and identical sound source comes from both the left and right speakers.

Audiophiles and sound engineers are always searching for increasingly creative methods for processing and manipulating audio channel information. For example, audiophiles and sound engineers have been searching for a technique for cleanly isolating information (e.g., vocals) from a stereo recording's center channel, where the information can be cleanly reintegrated with the original stereo recording. One technique for removing information from the center channel calls for inverting a left or right channel signal and adding the inverted and non-inverted signals together. This operation eliminates information that is common to both channels (i.e., the center channel). Although the technique eliminates center channel information from the original recording, it does not isolate the center channel information for further playback and/or processing. Another limitation of the technique is that the resulting signal is a monophonic signal.

SUMMARY

A system and method for processing multi-channel audio signals is described herein. In one embodiment, the system includes a phase detector to determine, for a frequency band, a phase difference between first and second channel signals of the multi-channel digital audio signal. In one embodiment, the system also includes an attenuator to attenuate an amplitude of the frequency band if the phase difference exceeds a first predetermined threshold.

In one embodiment, the method includes the following operations. For a frequency band, determining a phase difference between first and second channel signals of the multi-channel digital audio signal. In one embodiment, the method also includes attenuating an amplitude of the frequency band if the phase difference exceeds a first predetermined threshold.

BRIEF DESCRIPTION OF THE FIGURES

Embodiments of the present invention is illustrated by way of example and not limitation in the Figures of the accompanying drawings in which.

DESCRIPTION OF THE EMBODIMENTS

Systems and methods for processing multi-channel digital audio signals are described herein. This "description of the embodiments" is divided into four sections. The first section describes a system overview. The second section describes an exemplary operating environment and system architecture. The third section describes system operations and the fourth section provides general considerations regarding this document.

Overview

This section provides a broad overview of a system for processing multi-channel digital audio signals. In particular, this section describes a system for extracting a center channel from a stereo audio signal.

Figure 1:
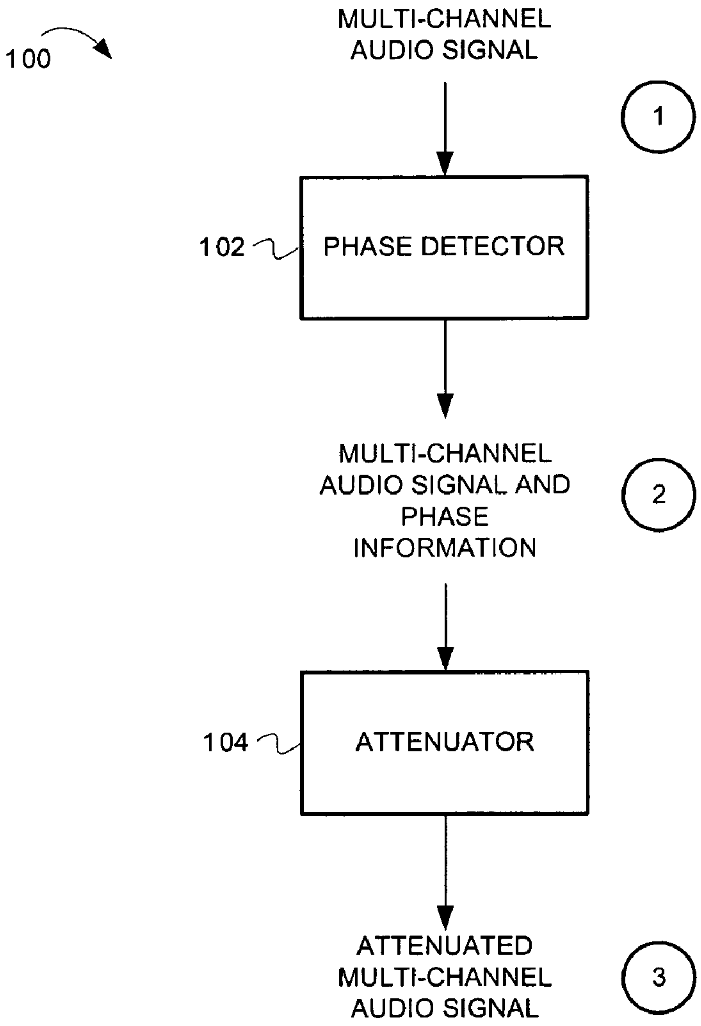
FIG. 1 is a dataflow diagram illustrating data flow in a system for processing multi-channel digital audio signals, according to exemplary embodiments of the invention.

FIG. 1 is a dataflow diagram illustrating data flow in a system for processing multi-channel digital audio signals, according to exemplary embodiments of the invention. In FIG. 1, the system 100 includes a phase detector 102 and an attenuator 104. The phase detector 102 and the attenuator 104 can be software running on a computer, according to embodiments of the invention.

The dataflow of FIG. 1 is divided into three stages. At stage one, the phase detector 102 receives a multi-channel digital audio signal. The multi-channel digital audio signal can include a first channel signal and a second channel signal, where each channel signal includes a phase. Additionally, each channel signal includes a plurality of frequency bands. In one embodiment, for a specific frequency band, the phase detector 102 determines a phase difference between the first and second channel signals.

During stage two, the phase detector 102 transmits the phase difference information to the attenuator 104. The attenuator 104 determines whether the phase difference exceeds a predetermined threshold. If the phase difference exceeds the predetermined threshold, the attenuator 104 attenuates an amplitude of the specific frequency band. In one embodiment, the attenuation will reduce or eliminate auditory volume of sounds at the specific frequency band.

During stage three, the attenuator 104 transmits an attenuated multi-channel digital audio signal for further processing, storage, and/or presentation.

While this overview describes operations performed by certain embodiments of the invention, other embodiments perform additional operations, as described in greater detail below.

Hardware, Operating Environment, and System Architecture

This section provides an overview of the exemplary hardware and operating environment in which embodiments of the invention can be practiced. This section also describes an exemplary architecture for a system for processing multi-channel digital audio signals. The operation of the system components will be described in the next section.

Exemplary Hardware and Operating Environment

Figure 2:
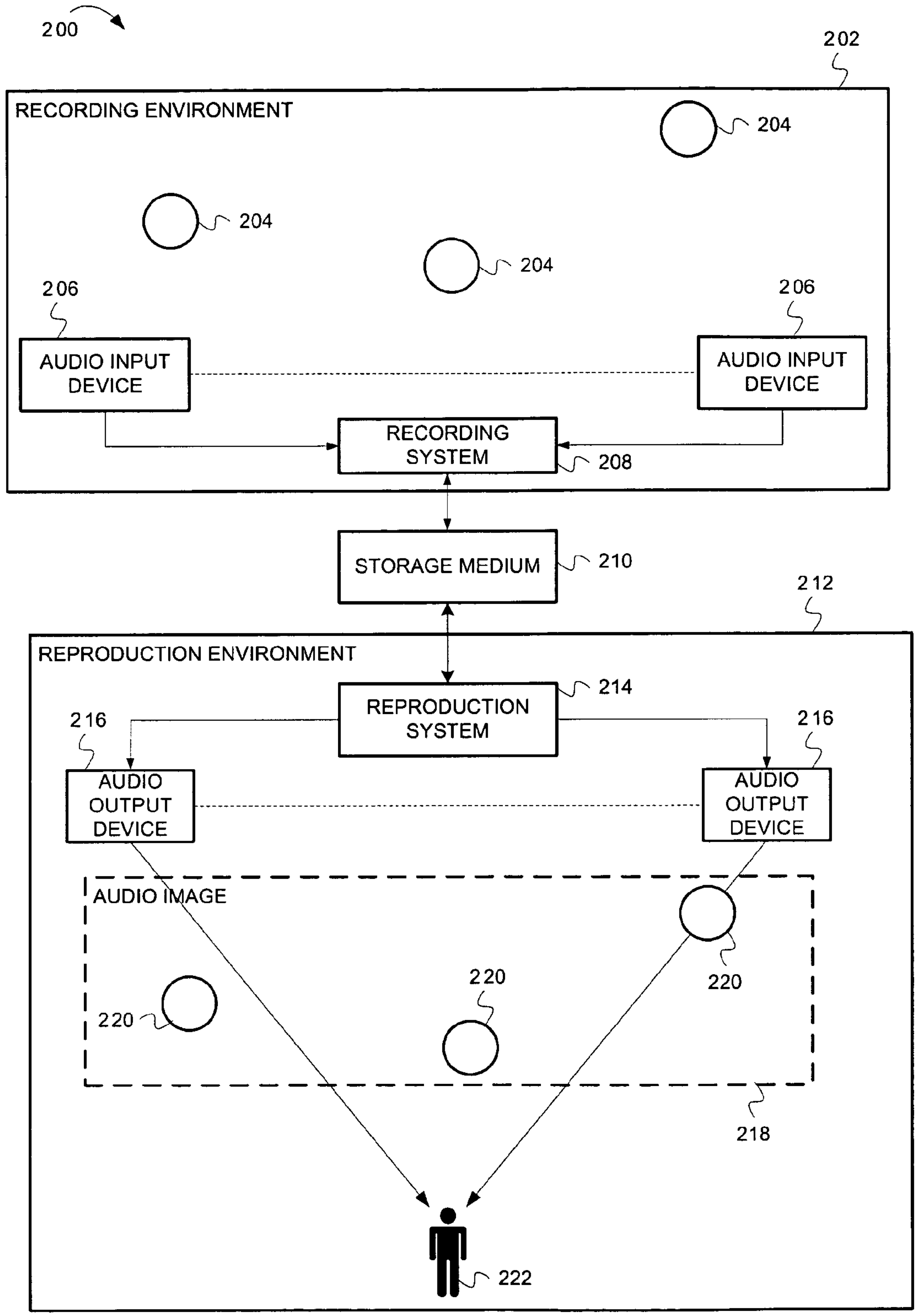
FIG. 2 is a block diagram illustrating an exemplary operating environment in which embodiments of the invention can be practiced.

FIG. 2 is a block diagram illustrating an exemplary operating environment 200 in which embodiments of the invention can be practiced. As shown in FIG. 2, the operating environment 200 includes a recording environment 202 and a reproduction environment 212. The recording environment 202 includes audio input devices 206 (e.g., microphones) connected to a recording system 208. The audio input devices 206 can create audio input signals based on sounds from sound sources 204 (e.g., musical instruments, vocals, or other sounds). The audio input devices 206 can transmit the audio input signals to the recording system 208, which can create one or more multi-channel digital audio signals based on the audio input signals. In some embodiments, one audio input device 206 can be used to record each instrument or voice, so the instrument or voice can be prominent in a channel. Later during mixing, instruments/voice can be placed in the left and/or right channels. The instruments or voices can be placed in a center channel by mixing the instrument/voice signal equally among the left and right channels.

The recording system 208 can include components for detecting a phase difference between first and second channels of the multi-channel digital audio signal. The recording system 208 can also include components for attenuating an amplitude of a specific frequency band of the multi-channel digital audio signal, where the attenuation is based on the phase difference. The recording system 208 can store the multi-channel digital audio signals on the storage medium 210 (e.g., CD-ROM, magnetic tape, DVD, etc.).

As shown in FIG. 2, the reproduction environment 212 includes a reproduction system 214 connected to audio output devices 216. The reproduction system 214 can be any suitable audio playback system, while the audio output devices 216 can be audio speakers or other suitable audio presentation devices. As shown in FIG. 2, the audio output devices 216 present multi-channel digital audio signals to a listener 222. The audio presentation can include a audio image 218, which includes virtual sound sources 220. The audio image 218 can be a stereo image or a binaural image. When presented, the audio image 218 replicates the aural position and perspective of the sound sources 204. According to embodiments, the listener 222 can perceive different sounds as he changes position relative to each virtual sound source 220. For example, the listener 222 can perceive certain sounds when positioned in front of the leftmost virtual sound source 220, while perceiving different sounds when positioned in front of the rightmost virtual sound source 220. The reproduction system 214 can include components for detecting a phase difference between first and second channels of the multi-channel digital audio signal. The reproduction system 214 can also include components for attenuating an amplitude of a specific frequency band of the multi-channel digital audio signal, where the attenuation is based on the phase difference.

Although FIG. 2 shows the reproduction environment 212 and the recording environment 202 connected to a common storage medium 210, other embodiments call for a standalone reproduction environment that includes a non-shared storage medium. According to embodiments, the reproduction environment 212 can be home stereo system, audio playback system of a desktop/notebook computer, karaoke machine, etc.

Figure 3:
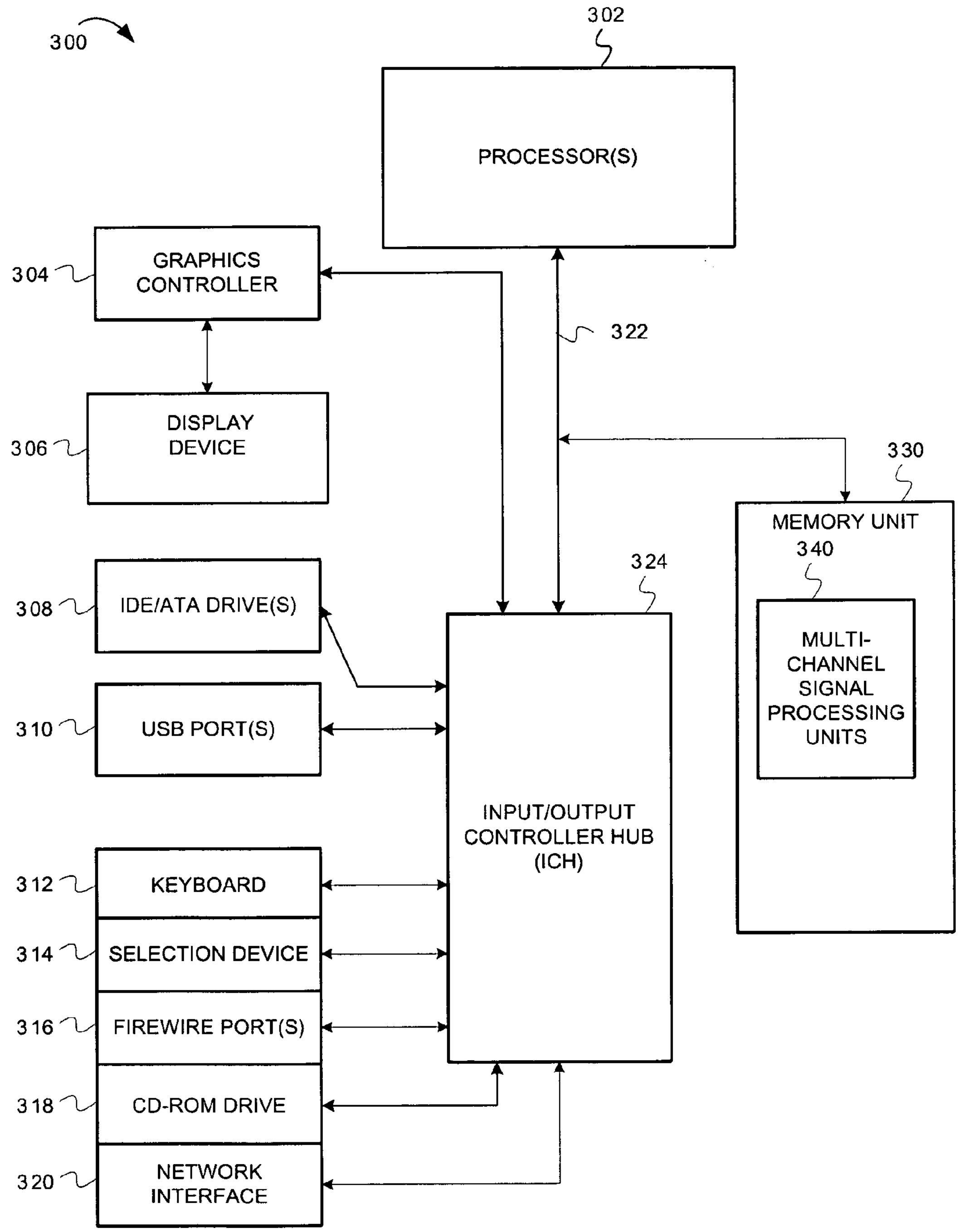
FIG. 3 illustrates an exemplary computer system used in conjunction with certain embodiments of the invention.

While FIG. 2 shows an exemplary operating environment for embodiments of the invention, FIG. 3 describes exemplary hardware and software that can be part of the operating environment or used in conjunction with embodiments of the invention.

FIG. 3 illustrates an exemplary computer system 300 used in conjunction with certain embodiments of the invention. According to certain embodiments, computer system 300 provides hardware and software components used for processing multi-channel digital audio signals, as described herein.

As illustrated in FIG. 3, computer system 300 comprises processor(s) 302. The computer system 300 also includes a memory unit 330, processor bus 322, and Input/Output controller hub (ICH) 324. The processor(s) 302, memory unit 330, and ICH 324 are coupled to the processor bus 322. The processor(s) 302 may comprise any suitable processor architecture. The computer system 300 may comprise one, two, three, or more processors, any of which may execute a set of instructions in accordance with embodiments of the present invention.

The memory unit 330 includes multi-channel digital audio signal processing units 340, which include instructions for performing operations described herein. The memory unit 330 stores data and/or instructions, and may comprise any suitable memory, such as a dynamic random access memory (DRAM), for example. The computer system 300 also includes IDE drive(s) 308 and/or other suitable storage devices. A graphics controller 304 controls the display of information on a display device 306, according to embodiments of the invention.

The input/output controller hub (ICH) 324 provides an interface to I/O devices or peripheral components for the computer system 300. The ICH 324 may comprise any suitable interface controller to provide for any suitable communication link to the processor(s) 302, memory unit 330 and/or to any suitable device or component in communication with the ICH 324. For one embodiment of the invention, the ICH 324 provides suitable arbitration and buffering for each interface.

For one embodiment of the invention, the ICH 324 provides an interface to one or more suitable integrated drive electronics (IDE) drives 308, such as a hard disk drive (HDD) or compact disc read only memory (CD ROM) drive, or to suitable universal serial bus (USB) devices through one or more USB ports 310. For one embodiment, the ICH 324 also provides an interface to a keyboard 312, a mouse 314, a CD-ROM drive 318, one or more suitable devices through one or more firewire ports 316. For one embodiment of the invention, the ICH 324 also provides a network interface 320 though which the computer system 300 can communicate with other computers and/or devices.

In one embodiment, the computer system 300 includes a machine-readable medium that stores a set of instructions (e.g., software) embodying any one, or all, of the methodologies for processing a multi-channel digital audio signal. Furthermore, software can reside, completely or at least partially, within memory unit 330 and/or within the processor(s) 302.

Exemplary System Architecture

Figure 4:
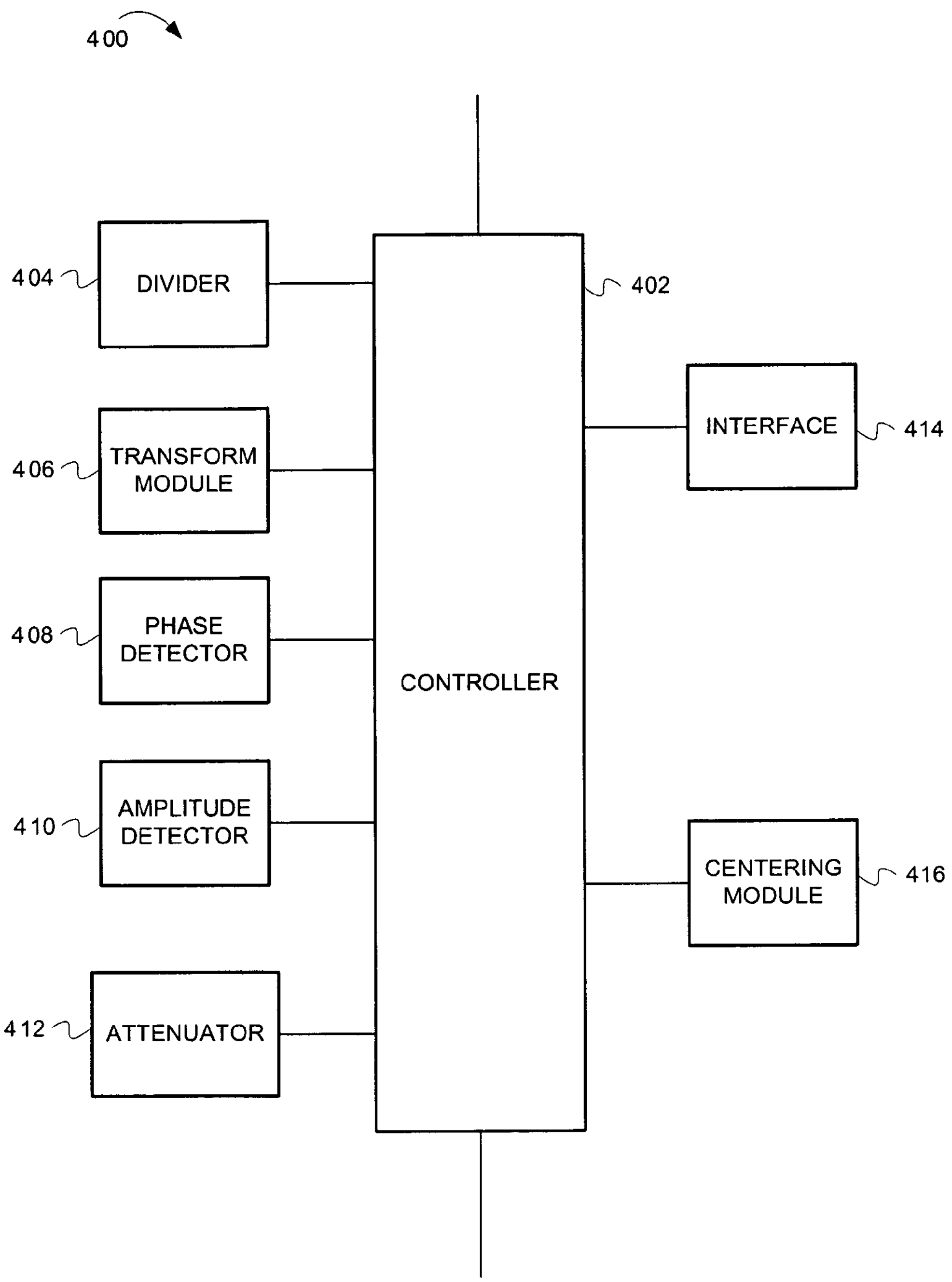
FIG. 4 is a block diagram illustrating a system for processing multi-channel digital audio signals, according to exemplary embodiments of the invention.

FIG. 4 is a block diagram illustrating a system 400 for processing multi-channel digital audio signals, according to exemplary embodiments of the invention. The system 400 may be implemented in software, firmware, hardware or some combination of the aforementioned. Where the system 400 is implemented in software, the system 400 may form a part of more fully functional audio processing software application. One such audio processing software application may be, for example, the ADOBE AUDITION™ software application, developed by Adobe Systems Inc., of San Jose Calif.

As shown in FIG. 4, the system 400 includes several functional units or modules for processing multi-channel digital audio signals. In particular, the system 400 includes a controller 402 connected to a divider 404, transform module 406, phase detector 408, amplitude detector 410, attenuator 412, interface 414, and centering module 416.

According to embodiments, the controller 402 can receive and process a multi-channel digital audio signal using the units of the system 400. After receiving a multi-channel digital audio signal, the controller 402 can employ the phase detector 408 to determine whether there is a phase difference between two channels of the multi-channel digital audio signal. The controller 402 can also employ the amplitude detector 410 to determine amplitude difference between two channels of the multi-channel digital audio signal and the attenuator 412 to calculate an attenuation factor based on at least one of the phase and/or amplitude differences.

The controller 402 can also employ the centering module 416 to place certain portions of the multi-channel digital audio signal in a center channel by delaying samples of the multi-channel digital audio signal. The interface 414 can receive user selected audio processing configurations, such as user selected frequency bands. The divider 404 can divide the multi-channel digital audio signal into a set of one or more audio blocks. The transform module 406 can transform the multi-channel digital audio signal from the time domain to the frequency domain.

According to embodiments, these functional units can be integrated or divided, forming a lesser or greater number of functional units. According to embodiments, the functional units can include queues, stacks, or other data structures necessary for performing processing multi-channel digital audio signals. Moreover, the functional units can be communicatively coupled using any suitable communication method (message passing, parameter passing, signals, etc.). Additionally, the functional units can be physically connected according to any suitable interconnection architecture (fully connected, hypercube, etc.).

Any of the functional units or modules used in conjunction with embodiments of the invention can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

According to embodiments of the invention, the functional units or modules of the system 400 can include software stored and executed by a computer system like that of FIG. 3. Alternatively, the functional units can include other types of logic (e.g., digital logic) for processing multi-channel digital audio signals.

While this section describes various functional units of a system for processing multi-channel digital audio signals, the next section describes operations performed by these functional units.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 5:
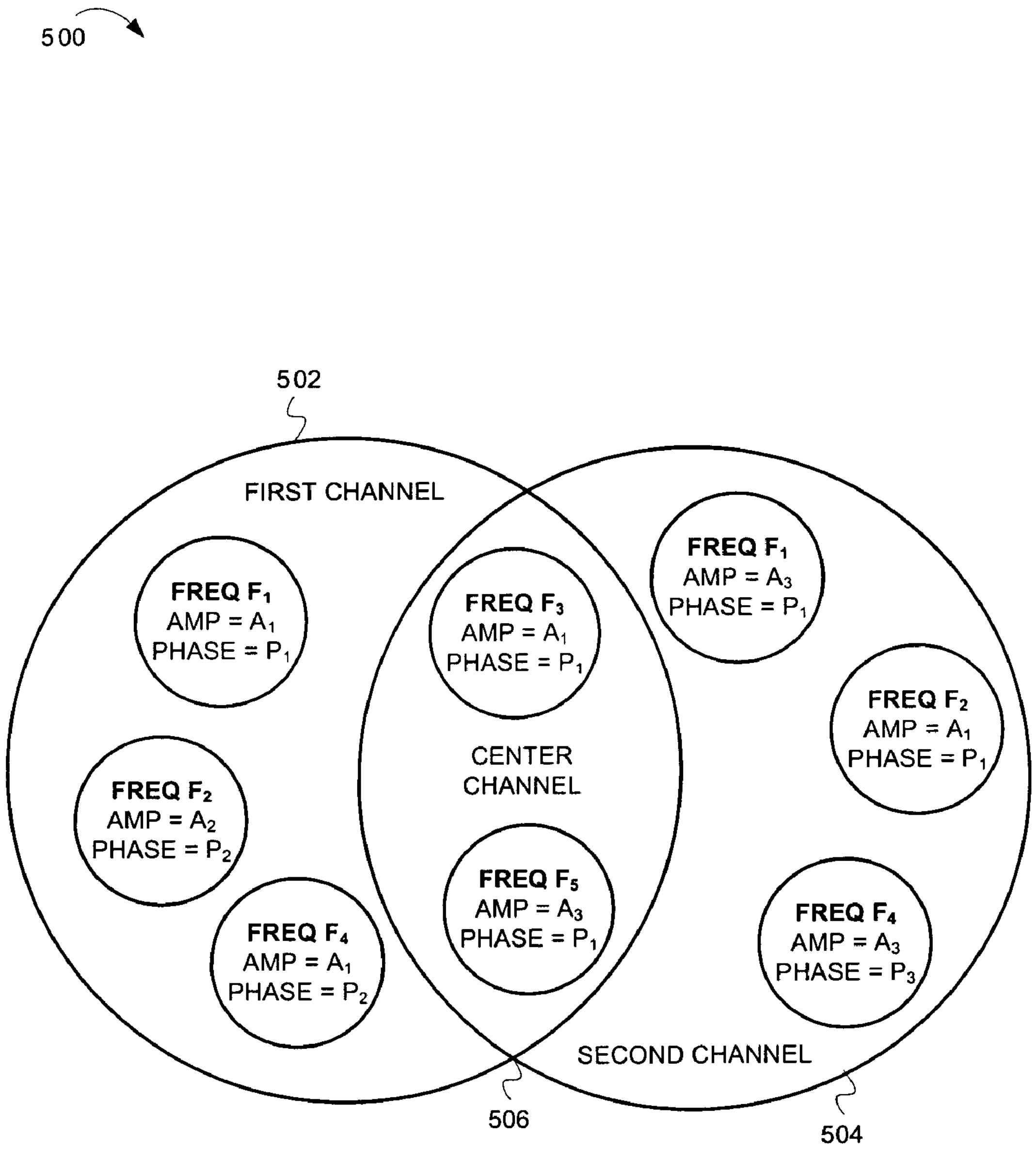
FIG. 5 is a block diagram illustrating a multi-channel digital audio signal, according to exemplary embodiments of the invention.
Figure 6:
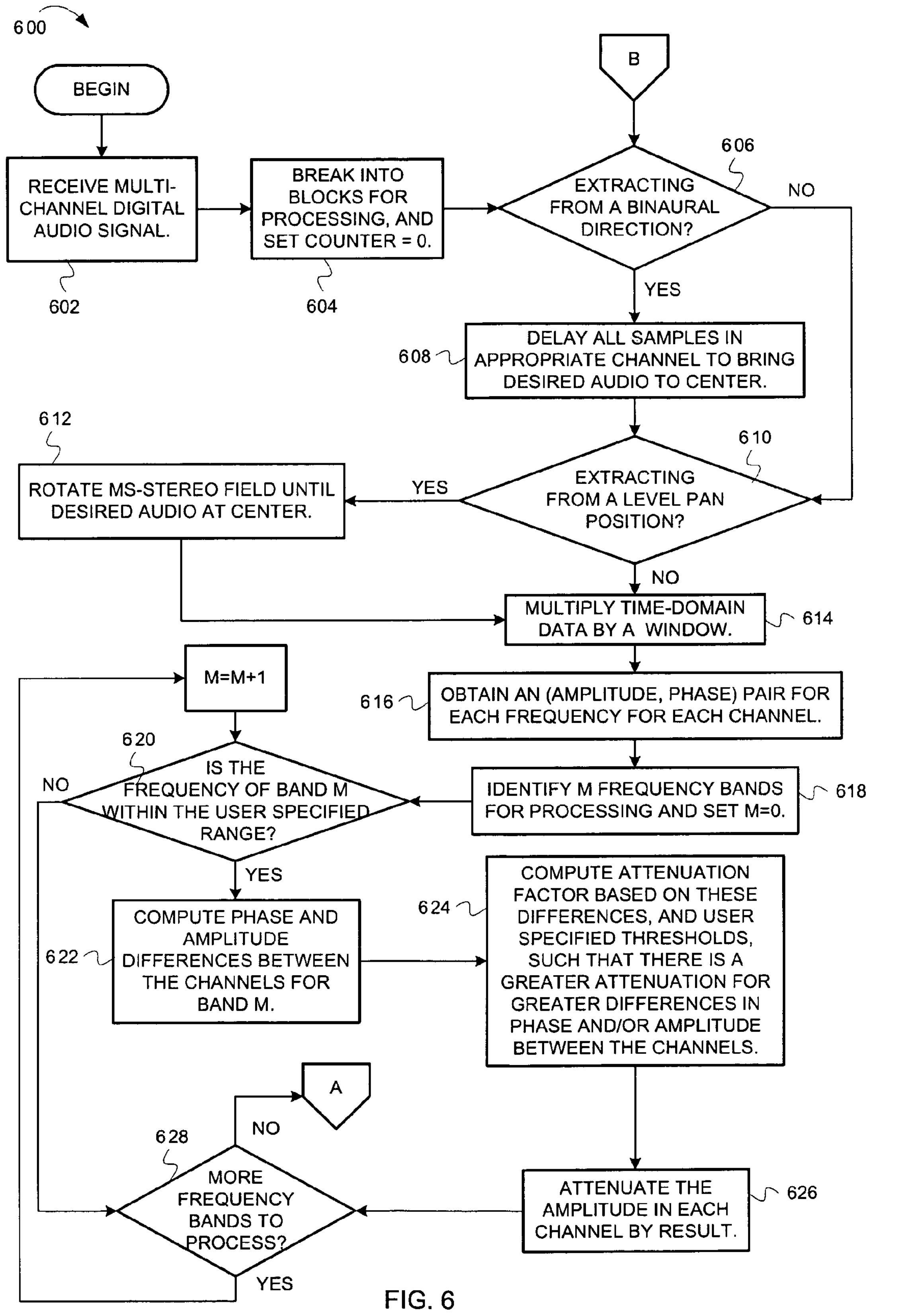
FIG. 6 is a flow diagram illustrating operations for determining and processing a center channel of a multi-channel digital audio signal, according to exemplary embodiments of the invention.
Figure 7:
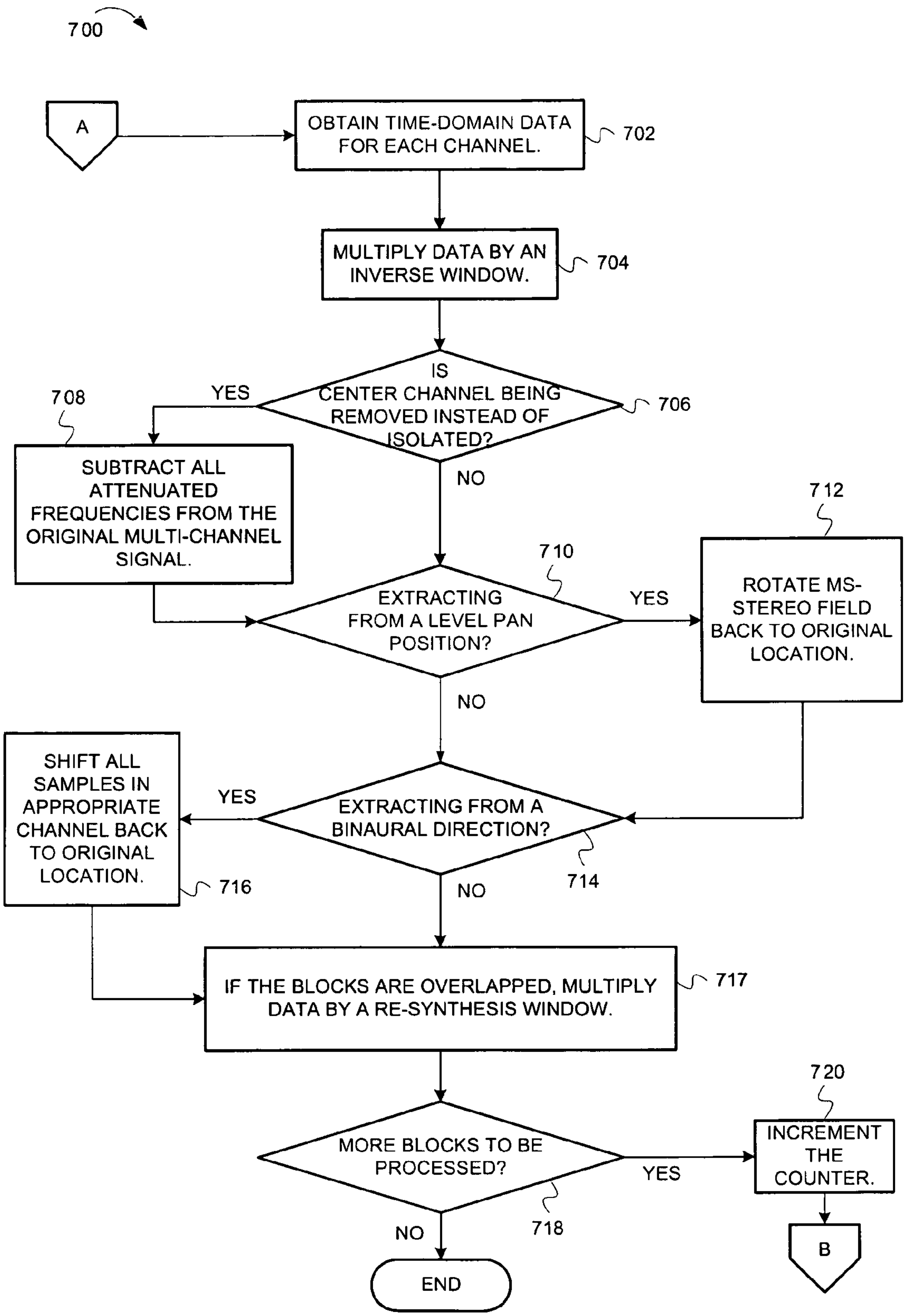
FIG. 7 is a flow diagram illustrating operations for integrating a center channel into a multi-channel digital audio signal, according to exemplary embodiments of the invention.
Figure 8:
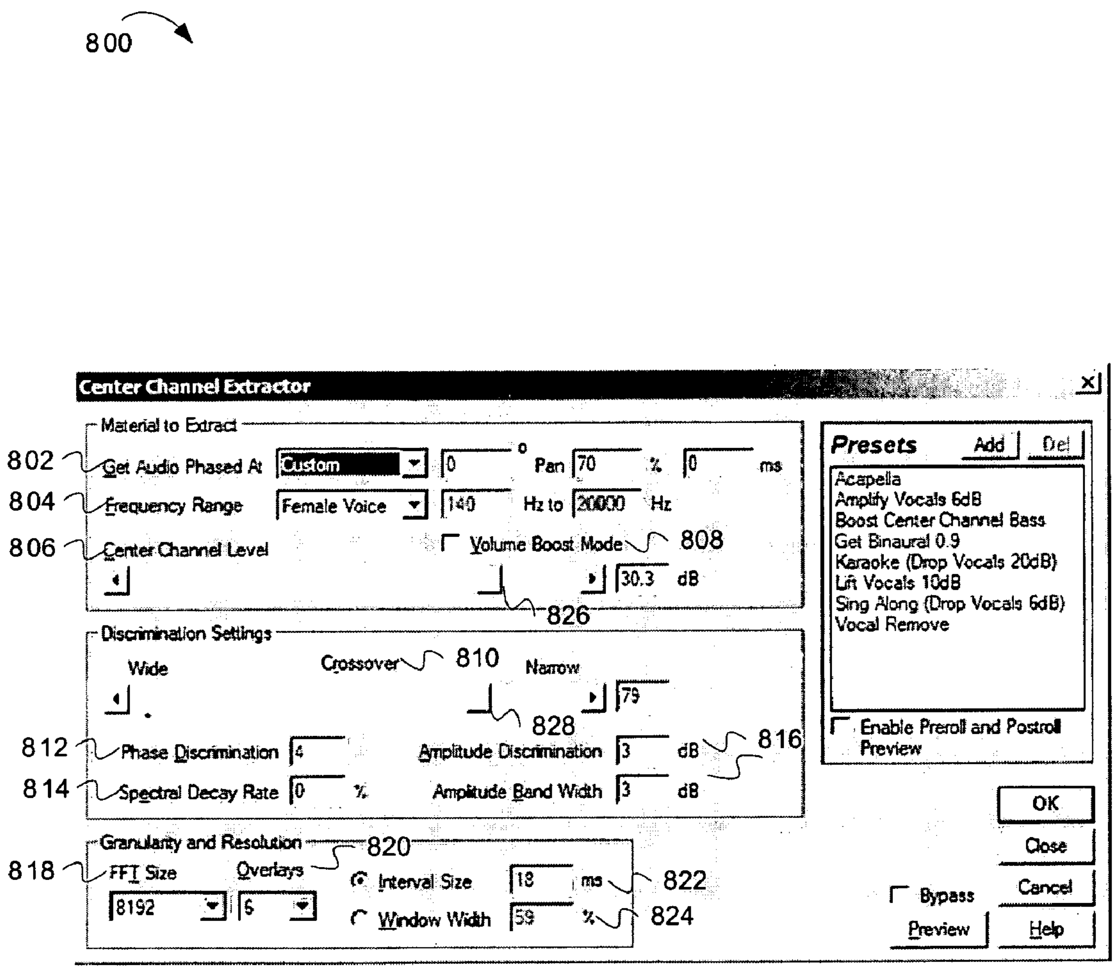
FIG. 8 shows a user interface through which user selected audio processing parameters can be received, according to exemplary embodiments of the invention.

In this section, FIGS. 5-8 will be discussed. FIG. 5 is a conceptual description of a multi-channel digital audio signal. FIGS. 6 and 7 describe operations for processing multi-channel digital audio signals, while FIG. 8 shows spectral images of multi-channel digital audio signals.

Before describing operations for processing multi-channel digital audio signals, this section will describe an exemplary multi-channel digital audio signal. FIG. 5 is a block diagram illustrating a multi-channel digital audio signal, according to exemplary embodiments of the invention. As shown in FIG. 5, in the frequency domain, an exemplary multi-channel digital audio signal 500 includes a first channel 502 and a second channel 504. The first channel 502 includes five frequencies ($F_1$, $F_2$, $F_3$, $F_4$, and $F_5$), where each frequency includes an (amplitude, phase) pair. The second channel 504 also includes five frequencies ($F_1$, $F_2$, $F_3$, $F_4$, and $F_5$), where each frequency includes an (amplitude, phase) pair. If a frequency and (amplitude, phase) pair resides in the first channel 502 and that same frequency and (amplitude, phase) pair resides in the second channel 504, the frequency and (amplitude, phase) pair is included in a center channel 506. For example, $F_3(A_1, P_1)$ and $F_5(A_3, P_1)$ reside in both the first channel 502 and the second channel 504. As a result, the center channel 506 includes $F_3(A_1, P_1)$ and $F_5(A_3, P_1)$. In some embodiments, a frequency and (amplitude, phase) pair can reside in the center channel if the frequency and (amplitude, phase) pair meets certain user-specified conditions. According to embodiments, the multi-channel digital audio signal processing system 400 examines a frequency's phase and/or amplitude components (e.g., $A_1$ and/or $P_1$ of $F_3(A_1, P_1)$) when attenuating a multi-channel digital audio signal's center channel. Operations for processing and attenuating a multi-channel digital audio signal's center channel are described below.

FIG. 6 is a flow diagram illustrating operations for separating and processing a center channel of a multi-channel digital audio signal, according to exemplary embodiments of the invention. The flow diagram 600 will be described with reference to the exemplary system shown in FIG. 4. The flow diagram 600 commences at block 602.

At block 602, a multi-channel digital audio signal is received. For example, the controller 402 receives a multi-channel digital audio signal. The flow continues at block 604.

At block 604, the multi-channel digital audio signal is broken into a number of blocks and a counter is set equal to 0. For example, the divider 404 divides the multi-channel digital audio data into a number of blocks and assigns a counter a value of 0. In one embodiment, the blocks can be overlapped (i.e., each block can contain audio data from a previous block). In one embodiment, using the interface 414, a user can specify an amount of overlap between the blocks. The flow continues at block 606.

At block 606, a determination is made about whether the processing includes extracting from a binaural direction. For example, the controller 402 determines whether processing includes extracting from a binaural direction. If the processing includes extracting from a binaural direction, the flow continues at block 608. Otherwise, the flow continues at block 610.

At block 608, samples of an appropriate channel are delayed to bring a portion of the multi-channel digital audio signal into a center channel. For example, the centering module 416 delays samples of an appropriate channel in order to bring a portion of the multi-channel digital audio signal into a center channel. The flow continues at block 610.

At block 610, a determination is made about whether the processing includes extracting from a level pan position. For example, the controller 402 determines whether the processing includes extracting from a level pan position. If the processing includes extracting from a level pan position, the flow continues at block 612. Otherwise, the flow continues at block 614.

At block 612, the mid-side stereo field is rotated until the desired signal portion is in the center channel. For example, the centering module 416 rotates the mid-side stereo field until the signal portion is a center channel. The flow continues at block 614.

At block 614, time-domain data included within the multi-channel digital audio signal is multiplied by a window. For example, the transform module 406 multiplies time-domain data included within the multi-channel digital audio signal by a Blackman-Harris window or other suitable window. The flow continues at block 616.

At block 616, an (amplitude, phase) pair is obtained for each frequency and for each channel of the audio data. For example, the transform module 406 applies a Fast Fourier Transform to the multi-channel digital audio signal to obtain an (amplitude, phase) pair for each frequency and for each channel of the signal. The flow continues at block 618.

At block 618, a number of frequency bands are identified and M is assigned a value of 0. For example, the controller 402 identifies a number frequency bands within the multi-channel digital audio signal. The controller 402 also assigns M a value of 0. The flow continues at block 620.

At block 620, a determination is made about whether the frequency band M is within a user specified range. The controller 402 determines whether the frequency band M is within a user specified range. In one embodiment, the interface 414 receives the specified range though a user input device. If the frequency band M is within the user specified range, the flow continues at block 622. Otherwise, the flow continues at block 628.

At block 622, phase and amplitude differences are calculated for channels from frequency band M. For example, the phase detector 408 and amplitude detector 410 calculate phase and amplitude differences between the channels of frequency band M. The flow continues at block 624.

At block 624, an attenuation factor is computed based on the amplitude and phase differences. For example, the attenuator 412 computes an attenuation factor based on the amplitude and phase differences of channels from frequency band M. In one embodiment, the attenuation factor is further based on user specified thresholds. In one embodiment, there is a greater attenuation factor for greater phase and/or amplitude differences between the channels. The flow continues at block 626.

At block 626, the amplitude in each channel is attenuated based on the attenuation factor. For example, the attenuator 412 attenuates the amplitude for each channel of frequency band M based on the attenuation factor. The flow continues at block 628.

At block 628, a determination is made about whether there are more frequency bands to process. The controller 402 determines whether there are more frequency bands to process. If there are more frequency bands to process, M is incremented (at block 630) and the flow continues at block 620. Otherwise, the flow continues at "A". "A" continues in FIG. 7, which is discussed below.

FIG. 7 is a flow diagram illustrating operations for integrating a center channel into a multi-channel digital audio signal, according to exemplary embodiments of the invention. The flow diagram 700 will be described with reference to the exemplary system shown in FIG. 4. The flow diagram 700 commences at block 602.

At block 702, time-domain data is obtained for each channel. For example, the transform module 406 applies an Inverse Fast Fourier Transform to the multi-channel digital audio signal to obtain time-domain data for each channel. The flow continues at block 704.

At block 704, the multi-channel digital audio signal is multiplied by an inverse window. For example, the transform module 406 multiplies the multi-channel digital audio signal by an inverse Blackman-Harris window or other suitable inverse window. The flow continues at block 706.

At block 706, a determination is made about whether the center channel is being removed instead of isolated. If the center channel is being isolated, the flow continues at block 710. Otherwise, the flow continues at block 708.

At block 708, all attenuated frequency bands are subtracted from the original multi-channel digital audio signal. For example, the attenuator 412 subtracts all attenuated frequency bands from the original multi-channel digital audio signal. The flow continues at block 710.

At block 710, a determination is made about whether the center channel includes data representing a level pan position. If the center channel includes data representing a level pan position, the flow continues at block 712. Otherwise, the flow continues at block 714.

At block 712, the mid-side stereo field is rotated back to the original location. For example, the centering module 416 rotates the multi-channel digital audio signal's mid-side stereo field of back to its original location (see block 612). In one embodiment, the flow continues at block 714.

At block 714, the determination is made about whether the center channel includes information representing a binaural direction. If the center channel includes information representing a binaural direction, the flow continues at block 716. Otherwise, the flow continues at block 717.

At block 716, all center channel frequency bands are shifted back to their original location. For example, the centering module 416 shifts all center channel frequency bands back to their original location (see block 608). In one embodiment, the centering module 416 performs an inverse of the operation performed at block 608. The flow continues at block 717.

At block 717, if the blocks were overlapped (see discussion of block 604 above), the digital audio signal is multiplied by a re-synthesis window. For example, if the blocks were overlapped, the transform module 406 multiples the digital audio signal by a re-synthesis window. The flow continues at block 718.

At block 718, a determination is made about whether more blocks are to be processed. If more blocks are to be processed, the counter is incremented and the flow continues at "B" (see FIG. 6). Otherwise, the flow ends.

While FIGS. 6 and 7 describe operations for processing multi-channel digital audio signals, FIG. 8 shows an exemplary user interface through which audio processing selections can be received.

FIG. 8 shows a user interface through which user selected audio processing parameters can be received, according to exemplary embodiments of the invention. The user interface 800 can be used with embodiments described herein. Information received through the user interface 800 can be used for processing a center channel from multi-channel digital audio signal. Processing the center channel can keep or remove frequencies that are common to both the left and right channels (i.e., frequencies that are panned center).

The user interface 800 includes the several user-configurable settings. The user interface includes a "Get Audio Phased At" 802 setting, which specifies a phase degree, pan percentage, and delay time for audio that will be extracted or removed. A user can configure this setting to "center" (i.e., zero degrees) to work with audio that is panned to the exact center. To extract surround audio from a matrix mix, a user can configure this setting to "surround" (i.e., 180 degrees) to work with audio that is exactly out of phase between the left and right channels. A user can configuring this option to "custom" to modify phase degree and pan percentage, which can range from −100% (hard left) to 100% (hard right).

A "Frequency Range" 804 setting allows a user to set a range to extract or remove. Predefined ranges can include Male Voice, Female Voice, Bass, and Full Spectrum, and Custom. A user can configure this setting to "custom" to define a frequency range.

A "Center Channel Level" 806 setting allows a user to specify how much of a selected signal the user wants to extract or remove. A user can move the slider 826 to the left (negative values) to remove center channel frequencies and to the right (positive values) to remove panned stereo material.

A "Volume Boost Mode" 808 setting allows a user to boost center channel material if the Center Channel Level slider 806 is set to a positive value. The Volume Boost Mode also allows a user to boost panned stereo material if the slider is set to a negative values. This setting is especially useful for boosting vocals.

A "Crossover" 810 setting allows a user to control the amount of allowed bleed through. Moving the slider 828 to the left allows the user to increase audio bleed through and make the audio sound less artificial. Moving the slider to the right further separates center channel material from the mix.

A "Phase Discrimination" 812 setting allows a user to configure phase discrimination. In general, higher numbers work better for extracting the center channel, whereas lower values work better for removing the center channel. Lower values allow more bleed through and may not effectively separate vocals from a mix, but they may be more effective at capturing all the center material. In general, phase discrimination works well for user-entered values ranging from 2 to 7.

A "Spectral Decay Rate" 814 setting allows a user to configure spectral decay settings used when processing the multi-channel digital audio signal. A user can set the Keeping the Spectral Decay Rate 814 at 0% for faster processing on multiple CPUs and hyperthreaded computers. A user can set this between 80% and 88% to help smooth out background distortions.

The "Amplitude Discrimination" and "Amplitude Band Width" 816 settings allow a user to configure a sum of the left and right channels and create a 180 degree-out-of-phase third channel that system uses to remove similar frequencies. If the volume at each frequency is similar, audio in common between both channels is also considered. Lower values for Amplitude Discrimination and Amplitude Band Width cut more material from the mix, but may also cut out vocals. Higher values make the extraction depend more on the phase of the material and the less on the channel amplitude. Amplitude Discrimination settings between 0.5 and 10 and Amplitude Band Width settings between 1 and 20 work well.

The "FFT Size" 818 setting allows a user to specify the size of the FFT (Fast Fourier Transform), affecting processing speed and quality. In general, settings between 4086 and 10,240 work best. Higher values (such as the default value of 8182) provide cleaner sounding filters.

An "Overlays" 820 setting allows a user to define the number of FFTs that overlap. Higher values can produce smoother results or a chorus-like effect, but they take longer to process. Lower values can produce bubbly-sounding background noises. Values of 3 to 8 work well.

A "Interval Size" 822 setting allows a user to set the time interval (measured in milliseconds) per FFT taken. Values between 10 and 50 milliseconds usually work best, but higher overlay settings may require a different value.

A "Window Width" 824 setting allows a user to specify the interval (measured as a percentage) used per FFT taken. Values of 30% to 100% work well.

Figure 9:
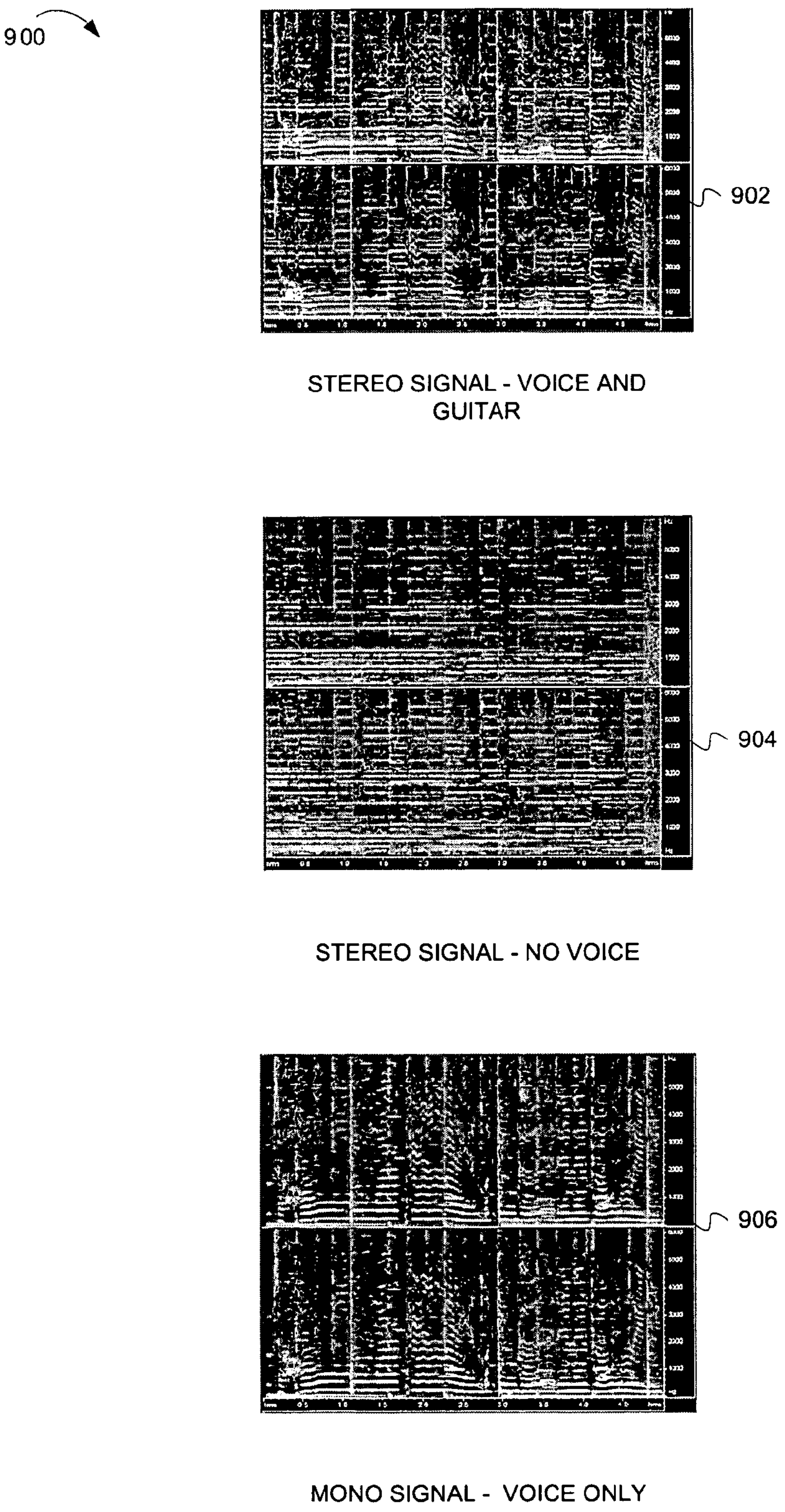
FIG. 9 shows spectrograms of multi-channel digital audio signals, according to embodiments of the invention.

FIG. 9 shows spectrograms of multi-channel digital audio signals, according to embodiments of the invention. FIG. 9 shows three images. In FIG. 9, a first audio image 902 includes voice and guitar. A second audio image 906 shows the voice portion of the first audio image 902, while a third audio image 904 shows the first audio image 902, where the voice portion has been removed (i.e., the guitar portion of the first audio image 902).

The 1024-point FFT spectrogram of FIG. 9 shows a range up to 6 KHz. In these plots, the brighter the spectrogram at any point in time and frequency, the higher the amplitude. This spectrogram does not show phase.

Although the discussion above describes systems and operations for processing multi-channel digital audio signals, the systems and operations described herein can be employed to process other types of signals (e.g., video signals, seismic signals, etc.).

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A system to process a multi-channel digital audio signal, the system including:

a graphical user interface to receive input from a user identifying a frequency band;

a controller that receives the user input identifying the frequency band and to control processing of the multi-channel digital audio signal with regard to the frequency band by a plurality of functional units; and the plurality of functional units coupled to the controller, the plurality of functional units including:

a digital phase detector to determine, for the frequency band, a phase difference between first and second channel signals of the multi-channel digital audio signal;

an amplitude detector to determine, for the frequency band, an amplitude difference between the first and second channel signals of the multi-channel digital audio signal; and a digital attenuator (i) to calculate an attenuation factor based on a magnitude of at least one of the phase and amplitude differences, and (ii) to attenuate an amplitude of the frequency band of the multi-channel digital audio signal in accordance with the attenuation factor if the phase difference exceeds a first predetermined threshold or the amplitude difference exceeds a second predetermined threshold.

2. The system of claim 1, wherein a degree of attenuation of the amplitude corresponds to the attenuation factor.

3. The system of claim 1, wherein the attenuator is to remove the frequency band from the multi-channel digital audio signal.

4. The system of claim 1, wherein the attenuator is to attenuate the amplitude of each of the first and second channel signals of the multi-channel digital audio signal.

5. The system of claim 1, further including a centering module to locate audio in a center channel of the audio signal by delaying samples in at least the first channel of the multi-channel digital audio signal.

6. The system of claim 1, further including a centering module to locate audio in a center channel of the audio signal by rotating a stereo field generated by the multichannel digital audio signal.

7. The system of claim 1, including a divider to divide digital data, representing the multi-channel digital audio signal, into a plurality of audio blocks.

8. The system of claim 7, including a transform module to perform a Fast Fourier Transform (FFT) with respect to at least one of the plurality of audio blocks, to generate a plurality of frequency bands.

9. The system of claim 8, wherein the phase detector is to determine a phase difference between a left channel signal and right channel signal for each of the plurality of frequency bands.

10. The system of claim 8, wherein the amplitude detector that is to determine an amplitude difference between a left channel signal and a right channel signal for each of the plurality of frequency bands.

11. A method to process a multi-channel digital audio signal, the method including:

receiving, by a controller, identification of a frequency band as input through a graphical user interface, the controller to control processing of the multi-channel digital audio signal with regard to the frequency band by a plurality of functional units; and processing the multi-channel digital audio signal with regard to the frequency band by the plurality of functional units coupled to the controller, the plurality of functional units including a phase detector, an amplitude detector, and a digital attenuator, the processing including:

for the frequency band, utilizing the phase detector to digitally determine a phase difference between first and second channel signals of the multi-channel digital audio signal;

for the frequency band, utilizing the amplitude detector to determine an amplitude difference between first and second channel signals of the multi-channel digital audio signal; and utilizing the digital attenuator (i) to calculate an attenuation factor based on a magnitude of at least one of the phase and amplitude differences, and (ii) to digitally attenuate an amplitude of the frequency band in accordance with the attenuation factor if the phase difference exceeds a first predetermined threshold or the amplitude difference exceeds a second predetermined threshold.

12. The method of claim 11, further including portioning the multi-channel digital audio signal based on the phase difference.

13. The method of claim 11, wherein a degree of attenuation of the amplitude corresponds to the attenuation factor.

14. The method of claim 11, wherein the attenuating of the amplitude of the frequency band includes removing the frequency band from the multi-channel digital audio signal.

15. The method of claim 11, wherein the attenuating of the amplitude includes attenuating the amplitude of the first and second channel signals of the multi-channel digital audio signal.

16. The method of claim 11, further including rotating a stereo field generated by the multi-channel digital audio signal to locate audio in a center channel of the audio signal.

17. The method of claim 11, further including dividing, into a plurality of audio blocks, digital data representing the multi-channel digital audio signal.

18. The method of claim 17, further including performing a waveless transform with respect to at least one of the plurality of audio blocks, to generate a plurality of frequency bands.

19. The method of claim 11, wherein the phase difference between the first and second channel signals is determined for each of the plurality of frequency bands.

20. The method of claim 11, wherein the amplitude difference between the first and second channel signals is determined for each of the plurality of frequency bands.

21. The method of claim 11, further including subtracting the attenuated frequency from multi-channel digital audio signal.

22. A system to process audio signals and video signals, the system including:

a graphical user interface presented via a user interface to receive, via an input device, input from a user identifying a frequency band;

controller means that receives the user input identifying the frequency band and to control processing of the multi-channel digital audio signal with regard to the frequency band by a plurality of functional units; and the plurality of functional units coupled to the controller means, the plurality of functional units including:

first digital means for determining, for the frequency band, a phase difference between first and second channel signals of a digital audio signal;

second digital means for determining, for the frequency band, an amplitude difference between first and second channel signals of the multi-channel digital audio signal; and third digital means for (i) calculating an attenuation factor based on a magnitude of at least one of the phase and amplitude differences, and (ii) attenuating an amplitude of the frequency band in accordance with the attenuation factor if the phase difference exceeds a first predetermined threshold or the amplitude difference exceeds a second predetermined threshold.

23. A non-transitory machine-readable medium embodying a set of instructions which, when executed by a machine, cause the machine to perform operations comprising:

receive, by a controller process, input via a graphical user interface, the input identifying a frequency band, the controller process to control processing of the multi-channel digital audio signal with regard to the frequency band, the processing of the multi-channel digital audio signal including:

for the frequency band, digitally determining a phase difference between first and second channel signals of a multi-channel digital audio signal;

for the frequency band, determining an amplitude difference between first and second channel signals of the multi-channel digital audio signal;

calculating an attenuation factor based on a magnitude of at least one of the phase and amplitude differences; and digitally attenuating an amplitude of the frequency band in accordance with the attenuation factor if the phase difference exceeds a first predetermined threshold or the amplitude difference exceeds a second predetermined threshold.

24. The non-transitory machine-readable medium of claim 23, wherein a degree of attenuation of the amplitude corresponds to the attenuation factor.

25. The non-transitory machine-readable medium of claim 23, wherein the attenuator is to remove the frequency band from the multi-channel digital audio signal.

26. The non-transitory machine-readable medium of claim 23, wherein the attenuator is to attenuate the amplitude of each of the first and second channel signals of the multi-channel digital audio signal.

27. The non-transitory machine-readable medium of claim 23, further including a centering module to locate audio in a center channel of the audio signal by delaying samples in at least the first channel of the multi-channel digital audio signal.

28. The non-transitory machine-readable medium of claim 23, further including a centering module to locate audio in a center channel of the audio signal by rotating a stereo field generated by the multichannel digital audio signal.

29. The non-transitory machine-readable medium of claim 23, including a divider to divide digital data, representing the multi-channel digital audio signal, into a plurality of audio blocks.

30. The non-transitory machine-readable medium of claim 29, including a transform module to perform a Fast Fourier Transform (FFT) with respect to at least one of the plurality of audio blocks, to generate a plurality of frequency bands.

31. The non-transitory machine-readable medium of claim 30, wherein the phase detector is to determine a phase difference between a left channel signal and right channel signal for each of the plurality of frequency bands.

32. The non-transitory machine-readable medium of claim 30, wherein the amplitude detects that is to determine an amplitude difference between a left channel signal and a right channel signal for each of the plurality of frequency bands.

33. An apparatus comprising:

a controller to receive a multi-channel digital audio signal and to control processing of the multi-channel digital audio signal based on user selected audio processing configurations by plurality of functional units, the functional units including:

an interface module to present a graphical user interface through which to receive the user selected audio processing configurations;

a divider to divide the multi-channel audio signal interested of one or more digital audio blocks;

a centering module to place certain portions of the multi-channel digital signal in a center channel by delaying samples of the multi-channel digital audio signal;

a transform module to transform the digital multi-channel digital audio signal from the time domain into the frequency domain;

a digital phase detector to determine whether there is a phase difference between two channels of the multi-channel digital audio signal;

an amplitude detector to determine an amplitude difference between the two channels of the multi-channel digital audio signal; and an attenuator (i) to calculate an attenuator factor based on a magnitude of at least one of the phase and amplitude differences, and (ii) to attenuate an amplitude of the frequency band in accordance with the attenuation factor if the phase difference exceeds a first predetermined threshold or the amplitude difference exceeds a second predetermined threshold.

* * * * *